(12) United States Patent
Seligmann

(10) Patent No.: US 9,558,475 B2
(45) Date of Patent: Jan. 31, 2017

(54) LOCATION BASED TO-DO LIST REMINDERS

(75) Inventor: Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 3587 days.

(21) Appl. No.: 10/350,399

(22) Filed: Jan. 23, 2003

(65) Prior Publication Data

US 2004/0230685 A1 Nov. 18, 2004

Related U.S. Application Data

(60) Provisional application No. 60/380,140, filed on May 6, 2002.

(51) Int. Cl.
*G06Q 10/10* (2012.01)
*G01C 21/00* (2006.01)
*H04L 29/08* (2006.01)

(52) U.S. Cl.
CPC ............. *G06Q 10/109* (2013.01); *G01C 21/00* (2013.01); *H04L 67/10* (2013.01)

(58) Field of Classification Search
CPC ........ G01C 21/00; G06Q 10/109; H04L 67/10
USPC .......................................................... 709/228
See application file for complete search history.

(56) References Cited

U.S. PATENT DOCUMENTS

| | | | |
|---|---|---|---|
| 5,128,981 A | 7/1992 | Tsukamoto et al. | |
| 5,224,156 A | 6/1993 | Fuller et al. | |
| 5,276,731 A | 1/1994 | Arbel et al. | |
| 5,311,173 A * | 5/1994 | Komura et al. | 340/995.22 |
| 5,428,663 A | 6/1995 | Grimes et al. | |
| 5,479,476 A | 12/1995 | Finke-Anlauff | |
| 5,481,590 A | 1/1996 | Grimes | |
| 5,570,100 A * | 10/1996 | Grube et al. | 342/457 |
| 5,790,974 A * | 8/1998 | Tognazzini | 455/456.5 |
| 5,805,587 A | 9/1998 | Norris et al. | |
| 5,918,179 A | 6/1999 | Foladare et al. | |
| 5,938,721 A | 8/1999 | Dussell et al. | |
| 6,026,156 A | 2/2000 | Epler et al. | |
| 6,108,532 A | 8/2000 | Matsuda et al. | |

(Continued)

FOREIGN PATENT DOCUMENTS

DE 4400207 A1 7/1994
DE 19651781 A1 12/1996

(Continued)

OTHER PUBLICATIONS

Sabharwal, Paul, "CA Application No. 2,454,966 Office Action Mar. 16, 2011",, Publisher: CIPO, Published in: CA.

(Continued)

*Primary Examiner* — Patrice Winder
(74) *Attorney, Agent, or Firm* — Sheridan Ross P.C.

(57) ABSTRACT

A method and apparatus for determining when to remind a user about a task in a to-do list based on the user's current geo-location are disclosed. The illustrative embodiment employs a to-do list in which tasks have an associated geo-location, and optionally, a priority and/or a due date. The illustrative embodiment determines whether to remind the user about a task in the to-do list based on information including the following: the user's current location; the user's speed and direction of travel; the geo-locations of tasks in the to-do list; the priorities of tasks in the to-do list; and the due dates of tasks in the to-do list.

24 Claims, 2 Drawing Sheets

(56) References Cited

U.S. PATENT DOCUMENTS

| | | |
|---|---|---|
| 6,122,366 A | 9/2000 | Veschi et al. |
| 6,155,974 A | 12/2000 | Fish |
| 6,157,640 A | 12/2000 | Valentine |
| 6,160,481 A | 12/2000 | Taylor, Jr. |
| 6,185,433 B1 | 2/2001 | Lele et al. |
| 6,185,443 B1 | 2/2001 | Crowley |
| 6,208,859 B1 | 3/2001 | Halvorson |
| 6,212,470 B1 | 4/2001 | Seymour et al. |
| 6,222,482 B1 | 4/2001 | Gueziec |
| 6,353,611 B1 | 3/2002 | Norris et al. |
| 6,356,533 B1 | 3/2002 | Bruno et al. |
| 6,363,248 B1 | 3/2002 | Silverman |
| 6,396,416 B1 | 5/2002 | Kuusela et al. |
| 6,408,063 B1 | 6/2002 | Slotte et al. |
| 6,411,687 B1 | 6/2002 | Bohacek et al. |
| 6,434,404 B1 | 8/2002 | Claxton et al. |
| 6,442,242 B1 | 8/2002 | McAllister et al. |
| 6,484,033 B2 * | 11/2002 | Murray ............ 455/456.3 |
| 6,509,830 B1 * | 1/2003 | Elliott ............ 340/286.02 |
| 6,529,737 B1 | 3/2003 | Skinner et al. |
| 6,535,748 B1 | 3/2003 | Vuorio et al. |
| 6,542,584 B1 | 4/2003 | Sherwood et al. |
| 6,584,316 B1 | 6/2003 | Akhteruzzaman et al. |
| 6,622,087 B2 * | 9/2003 | Anderson ............ 701/533 |
| 6,640,230 B1 * | 10/2003 | Alexander et al. |
| 6,678,515 B1 | 1/2004 | Gillespie et al. |
| 6,701,160 B1 | 3/2004 | Pinder et al. |
| 6,714,778 B2 | 3/2004 | Nykaenen et al. |
| 6,741,678 B2 | 5/2004 | Cannell et al. |
| 6,760,581 B2 | 7/2004 | Dutta |
| 6,763,089 B2 | 7/2004 | Feigenbaum |
| 6,763,105 B1 | 7/2004 | Miura et al. |
| 6,795,710 B1 * | 9/2004 | Creemer ............ 709/218 |
| 6,813,264 B2 | 11/2004 | Vassilovski |
| 6,816,577 B2 | 11/2004 | Logan |
| 6,847,892 B2 | 1/2005 | Zhou et al. |
| 6,898,445 B2 | 5/2005 | Slettengren et al. |
| 6,906,701 B1 * | 6/2005 | Oueslati et al. ............ 345/170 |
| 6,917,680 B1 | 7/2005 | Korn et al. |
| 6,954,650 B2 * | 10/2005 | Sahinoglu ............ H04W 4/02 455/456.6 |
| 6,954,657 B2 | 10/2005 | Bork et al. |
| 6,968,179 B1 | 11/2005 | De Vries |
| 6,970,553 B1 | 11/2005 | Gao et al. |
| 6,978,136 B2 | 12/2005 | Jenniges et al. |
| 7,010,288 B2 | 3/2006 | Brown et al. |
| 7,016,855 B2 * | 3/2006 | Eaton et al. ............ 705/26.62 |
| 7,024,176 B2 | 4/2006 | Shimizu et al. |
| 7,024,229 B2 | 4/2006 | Nishimura |
| 7,127,259 B2 | 10/2006 | Ueda et al. |
| 7,130,644 B2 | 10/2006 | Kuwahra et al. |
| 7,139,722 B2 * | 11/2006 | Perrella et al. ............ 701/533 |
| 7,142,895 B2 | 11/2006 | Heatley |
| 7,149,300 B1 | 12/2006 | Khan et al. |
| 7,180,991 B2 | 2/2007 | Dhara et al. |
| 7,221,937 B2 * | 5/2007 | Lau ............ G06Q 10/109 455/2.01 |
| 7,236,774 B2 | 6/2007 | Lee |
| 7,418,482 B1 * | 8/2008 | Lusher et al. ............ 709/219 |
| 2001/0006893 A1 | 7/2001 | Yoshioka |
| 2001/0028709 A1 | 10/2001 | Makela et al. |
| 2001/0031633 A1 | 10/2001 | Tuomela et al. |
| 2002/0010008 A1 | 1/2002 | Bork et al. |
| 2002/0042262 A1 | 4/2002 | Aveling |
| 2002/0059434 A1 | 5/2002 | Karaoguz et al. |
| 2002/0067308 A1 * | 6/2002 | Robertson ............ 342/357.17 |
| 2002/0086680 A1 | 7/2002 | Hunzinger |
| 2002/0089421 A1 | 7/2002 | Farringdon et al. |
| 2002/0094076 A1 | 7/2002 | Chen |
| 2002/0098844 A1 | 7/2002 | Friedenfelds et al. |
| 2002/0146107 A1 | 10/2002 | Baals et al. |
| 2002/0186121 A1 | 12/2002 | Yoshikawa et al. |
| 2003/0003901 A1 | 1/2003 | Kuroiwa |
| 2003/0003922 A1 | 1/2003 | McClure |
| 2003/0039339 A1 | 2/2003 | Luehrig et al. |
| 2003/0040308 A1 | 2/2003 | Gieseke |
| 2003/0046304 A1 * | 3/2003 | Peskin et al. ............ 707/104.1 |
| 2003/0054865 A1 | 3/2003 | Byers et al. |
| 2003/0055912 A1 | 3/2003 | Martin, Jr. et al. |
| 2003/0086411 A1 | 5/2003 | Vassilovski |
| 2003/0095643 A1 | 5/2003 | Fortman et al. |
| 2003/0103415 A1 * | 6/2003 | Bates et al. ............ 368/28 |
| 2003/0112178 A1 | 6/2003 | Bajikar |
| 2003/0112930 A1 | 6/2003 | Bosik et al. |
| 2003/0134660 A1 | 7/2003 | Himmel et al. |
| 2003/0140088 A1 * | 7/2003 | Robinson ............ G06Q 10/10 709/202 |
| 2003/0186676 A1 | 10/2003 | Ogman et al. |
| 2003/0208113 A1 | 11/2003 | Mault et al. |
| 2003/0220835 A1 | 11/2003 | Barnes, Jr. |
| 2003/0228002 A1 | 12/2003 | Tucker et al. |
| 2004/0014486 A1 | 1/2004 | Carlton et al. |
| 2004/0067751 A1 | 4/2004 | Vandermeijden et al. |
| 2004/0072558 A1 | 4/2004 | Van Bosch |
| 2004/0082317 A1 | 4/2004 | Graefen |
| 2004/0086100 A1 | 5/2004 | Moore et al. |
| 2004/0128359 A1 | 7/2004 | Horvitz et al. |
| 2004/0137884 A1 | 7/2004 | Engstrom et al. |
| 2004/0147814 A1 | 7/2004 | Zancho et al. |
| 2004/0198427 A1 | 10/2004 | Kimbell et al. |
| 2004/0203935 A1 | 10/2004 | Dowling et al. |
| 2005/0048992 A1 | 3/2005 | Wu et al. |
| 2005/0107130 A1 | 5/2005 | Peterson, II |
| 2005/0254635 A1 | 11/2005 | Koretsky et al. |
| 2006/0079222 A1 | 4/2006 | Martin |
| 2006/0160530 A1 | 7/2006 | Tipley |
| 2007/0037605 A1 | 2/2007 | Logan |

FOREIGN PATENT DOCUMENTS

| | | |
|---|---|---|
| EP | 0865188 A2 | 9/1998 |
| EP | 0957619 A1 | 11/1999 |
| EP | 1 008 946 A1 | 6/2000 |
| EP | 1 172 991 | 1/2002 |
| GB | 2303271 A | 2/1997 |
| GB | 2357218 A | 6/2001 |
| JP | 4109961 A | 4/1992 |
| JP | 5111474 A | 5/1993 |
| JP | 6070898 A | 3/1994 |
| JP | 09113599 | 5/1997 |
| JP | H12-311145 | 11/2000 |
| JP | H14-208890 | 7/2002 |
| WO | 9716932 A1 | 5/1997 |
| WO | WO 97/50231 | 12/1997 |
| WO | 9837680 A2 | 8/1998 |
| WO | 0141457 A2 | 6/2001 |
| WO | 0150788 A1 | 7/2001 |
| WO | 0209396 A2 | 1/2002 |
| WO | 02071638 A1 | 9/2002 |
| WO | WO 02093501 | 11/2002 |
| WO | 03009622 A1 | 1/2003 |

OTHER PUBLICATIONS

Domingos, Luis, "EP Application No. 05012972.5 Office Action Apr. 23, 2009", Publisher: EPO, Published in: EP.

Domingos, Luis, "EP Application No. 05012972.5 Office Action Mar. 5, 2010"Publisher: EPO, Published in: EP.

Anwah, Olisa, "U.S. Appl. No. 10/262,798, Notice of Allowance Dec. 3, 2009", Publisher: USPTO, Published in: US.

S. Chhim, "CA Application No. 2,433,477 Office Action", Jan. 5, 2009, Publisher: CIPO, Published in: CA.

S.Chhim, "Canadian Patent Application No. 2,433,477 Office Action", Feb. 22, 2005, Publisher: CIPO, Published in: CA.

S.Chhim, "Canadian Patent Application No. 2,433,477 Office Action", Mar. 16, 2006, Publisher: CIPO, Published in: CA.

S.Chhim, "Canadian Patent Application No. 2,433,477 Office Action", May 1, 2008, Publisher: CIPO, Published in: CA.

S.Chhim, "Canadian Patent Application No. 2,433,477 Office Action", Jun. 5, 2007, Publisher: CIPO, Published in: CA.

S.Chhim, "Canadian Patent Application No. 2,433,477 Office Action", Jul. 5, 2005, Publisher: CIPO, Published in: CA.

(56) References Cited

OTHER PUBLICATIONS

S.Chhim, "Canadian Patent Application No. 2,433,477 Office Action", Aug. 31, 2006, Publisher: CIPO, Published in: CA.
Domingos, Luis, "EP Application No. 03254177.3 Office Action", Feb. 14, 2006, Publisher: EPO, Published in: EP.
Domingos, Luis, "EP Application No. 03254177.3 Office Action", Mar. 24, 2005, Publisher: EPO, Published in: EP.
Domingos, L., "EP Application No. 03254177.3 Office Action Aug. 24, 2006", Publisher: EPO, Published in: EP.
Domingos, Luis, "EP Application No. 03254177.3 Search Report", Jun. 16, 2004, Publisher: EPO, Published in: EP.
Domingos, Luis, "EP Application No. 03254177.3 Search Report", Sep. 10, 2004, Publisher: EPO, Published in: EP.
Domingos, L., "EP Application No. 05012972.5 Office Action", Feb. 24, 2006, Publisher: EPO, Published in: EP.
Domingos, Luis, "EP Application No. 05012972.5 Office Action", Jul. 5, 2007, Publisher: EPO, Published in: EP.
Domingos, Luis, "EP Application No. 05012972.5 Search Report", Aug. 29, 2005, Publisher: EPO, Published in: EP.
Win, Aung T., "U.S. Appl. No. 10/186,443, Decision on Appeal Nov. 19, 2008"Publisher: USPTO, Published in: US.
Win, Aung T., "U.S. Appl. No. 10/186,443, Examiner's Answer Feb. 25, 2008", Publisher: USPTO, Published in: US.
Win, Aung T., "U.S. Appl. No. 10/186,443, Office Action", Nov. 16, 2007, Publisher: USPTO, Published in: US.
Chang, Wei H, "U.S. Appl. No. 10/186,443, Office Action", Dec. 28, 2004, Publisher: USPTO, Published in: US.
Win, Aung T., "U.S. Appl. No. 10/186,443, Office Action", Feb. 20, 2007, Publisher: USPTO, Published in: US.
Win, Aung T., "U.S. Appl. No. 10/186,443, Office Action Mar. 19, 2008"Publisher: USPTO, Published in: US.
Win, Aung T., "U.S. Appl. No. 10/186,443, Office Action", Mar. 20, 2006, Publisher: USPTO, Published in: US.
Win, Aung T., "U.S. Appl. No. 10/186,443, Office Action", Jul. 14, 2005, Publisher: USPTO, Published in: US.
Win, Aung T., "U.S. Appl. No. 10/186,443, Office Action", Aug. 10, 2006, Publisher: USPTO, Published in: US.
S.Chhim, "CA Application No. 2,433,478 Office Action", Feb. 22, 2005, Publisher: CIPO, Published in: CA.
S.Chhim, "CA Application No. 2,433,478 Office Action", Feb. 28, 2006, Publisher: CIPO, Published in: CA.
S.Chhim, "CA Application No. 2,433,478 Office Action", Aug. 5, 2005, Publisher: CIPO, Published in: CA.
Gkeli, M, "EP Application No. 03254175.7 Office Action", Jul. 17, 2006, Publisher: EPO, Published in: EP.
Gkeli, M, "EP Application No. 03254175.7", Jul. 4, 2005, Publisher: EPO, Published in: EP.
Gkeli, M, "EP Application No. 03254175.7 Search Report", Sep. 19, 2003, Publisher: EPO, Published in: EP.
Tieu, Benny Quoc, "U.S. Appl. No. 10/186,859, Notice of Allowance", Jan. 24, 2006, Publisher: USPTO, Published in: US.
Tieu, Benny Quoc, "U.S. Appl. No. 10/186,859, Office Action", Dec. 1, 2005, Publisher: USPTO, Published in: US.
Tieu, Benny Quoc, "U.S. Appl. No. 10/186,859, Office Action", Dec. 16, 2004, Publisher: USPTO, Published in: US.
Tieu, Benny Quoc, "U.S. Appl. No. 10/186,859, Office Action", Jun. 7, 2005, Publisher: USPTO, Published in: US.
Tieu, Benny Quoc, "U.S. Appl. No. 10/186,859, Office Action", Sep. 20, 2005, Publisher: USPTO, Published in: US.
Harold, Jefferey F., "U.S. Appl. No. 10/263,616, Notice of Allowance Aug. 30, 2006"Publisher: USPTO, Published in: US.
Harold, Jefferey F, "U.S. Appl. No. 10/263,616, Office Action", Dec. 17, 2004, Publisher: USPTO, Published in: US.
Harold, Jefferey F, "U.S. Appl. No. 10/263,616, Office Action", Dec. 29, 2005, Publisher: USPTO, Published in: US.
Harold, Jeffery F, "U.S. Appl. No. 10/263,616, Office Action", Apr. 7, 2006, Publisher: USPTO, Published in: US.
Harold, Jefferey F, "U.S. Appl. No. 10/263,616, Office Action", Jun. 28, 2005, Publisher: USPTO, Published in: US.
Hashem, Lisa, "U.S. Appl. No. 10/262,798, Office Action", Oct. 4, 2007, Publisher: USPTO, Published in: US.
Hashem, Lisa, "U.S. Appl. No. 10/262,798, Office Action", Nov. 18, 2008, Publisher: USPTO, Published in: US.
Hashem, Lisa, "U.S. Appl. No. 10/262,798, Office Action", Nov. 3, 2004, Publisher: USPTO, Published in: US.
Hashem, Lisa, "U.S. Appl. No. 10/262,798, Office Action", Nov. 6, 2003, Publisher: USPTO, Published in: US.
Hashem, Lisa, "U.S. Appl. No. 10/262,798, Office Action", Jan. 24, 2007, Publisher: USPTO, Published in: US.
Hashem, Lisa, "U.S. Appl. No. 10/262,798, Office Action", Mar. 1, 2006, Publisher: USPTO, Published in: US.
Hashem, Lisa, "U.S. Appl. No. 10/262,798, Office Action", Apr. 7, 2008, Publisher: USPTO, Published in: US.
Hashem, Lisa, "U.S. Appl. No. 10/262,798, Office Action", May 7, 2004, Publisher: USPTO, Published in: US.
Hashem, Lisa, "U.S. Appl. No. 10/262,798, Office Action", Jul. 28, 2005, Publisher: USPTO, Published in: US.
Hashem, Lisa, "U.S. Appl. No. 10/262,798, Office Action", Sep. 29, 2006, Publisher: USPTO, Published in: US.
Hashem, Lisa, "U.S. Appl. No. 10/262,798, Panel Decision Jul. 17, 2007", , Publisher: USPTO, Published in: US.
Hashem, Lisa, "U.S. Appl. No. 10/262,798, Panel Decision Sep. 2, 2008", , Publisher: USPTO, Published in: US.
Deczky, Kristina, "CA Application No. 2,454,966 Office Action Mar. 26, 2008", , Publisher: CIPO, Published in: CA.
Deczky, Kristina, "CA Application No. 2,454,966 Office Action May 15, 2007", , Publisher: CIPO, Published in: CA.
Deczky, Kristina, "CA Application No. 2,454,966 Office Action May 25, 2006", , Publisher: CIPO, Published in: CA.
Breidenich, M, "EP Application No. 04250199.9 Office Action Jan. 19, 2005", , Publisher: EPO, Published in: EP.
Breidenich, M, "EP Application No. 04250199.9 Oral Proceedings Minutes", May 26, 2006, Publisher: EPO, Published in: EP.
, "EP Application No. 04250199.9 Search Report", Apr. 1, 2004, Publisher: EPO, Published in: EP.
Breidenich, M, "EP Application No. 04250199.9 Summons to Oral Proceedings", Feb. 14, 2006, Publisher: EP, Published in: EP.
Lee, Gwi-Nam, "KR Application No. 10-2004-0003629 Office Action Apr. 13, 2006", , Publisher: KR, Published in: KR.
Lee, Gwi-Nam, "KR Application No. 10-2004-0003629 Office Action", Sep. 20, 2005, Publisher: KIPO, Published in: KR.
Smith, Creighton H., "U.S. Appl. No. 10/375,252, Notice of Allowance", Nov. 4, 2005, Publisher: USPTO, Published in: US.
Smith, Creighton H., "U.S. Appl. No. 10/375,252", Apr. 22, 2005, Publisher: USPTO, Published in: US.
Smith, Creighton H., "U.S. Appl. No. 10/375,252", Jun. 17, 2005, Publisher: USPTO, Published in: US.
Smith, Creighton H, "U.S. Appl. No. 10/375,641, Notice of Allowance", Apr. 22, 2005, Publisher: US, Published in: US.
Jean A. Gelin, "PCT Application No. PCT/US03/14041 Office Action Apr. 7, 2004", , Publisher: PCT, Published in: PCT.
Jean A. Gelin, "PCT Application No. PCT/US03/14041 Search Report Oct. 23, 2003", Publisher: PCT, Published in: PCT.
Mian, Ali, "CA Application No. 2,488,428 Office Action May 16, 2008", , Publisher: CIPO, Published in: CA.
Rabe, M, "EP Application No. 04257418.6 Office Action", Mar. 1, 2006, Publisher: EPO, Published in: EP.
Rabe, M., "EP Application No. 04257418.6 Search Report", Oct. 4, 2005, Publisher: EPO, Published in: EP.
Fritz, Bradford F, "U.S. Appl. No. 10/727,915, Office Action", Oct. 9, 2007, Publisher: USPTO, Published in: US.
Fritz, Bradford F., "U.S. Appl. No. 10/727,915, Office Action", Apr. 16, 2008, Publisher: USPTO, Published in: US.
Fritz, Bradford F., "U.S. Appl. No. 10/727,915, Panel Decision Aug. 8, 2008"Publisher: USPTO, Published in: US.
Smith, Creighton H., "U.S. Appl. No. 11/169,552, Notice of Allowance", Jan. 23, 2008, Publisher: USPTO, Published in: US.
Smith, Creighton H, "U.S. Appl. No. 11/169,552, Office Action", Oct. 16, 2007, Publisher: USPTO, Published in: US.
Smith, Creighton H, "U.S. Appl. No. 11/169,552, Office Action", Dec. 21, 2006, Publisher: USPTO, Published in: US.

(56) References Cited

OTHER PUBLICATIONS

Smith, Creighton H., "U.S. Appl. No. 11/169,552, Office Action Mar. 12, 2007"Publisher: USPTO, Published in: US.
Smith, Creighton H., "U.S. Appl. No. 11/169,552, Office Action Aug. 9, 2007", Publisher: USPTO, Published in: US.
Fritz, Bradford F., "U.S. Appl. No. 10/727,915, Examiner's Answer Brief Jan. 28, 2009"Publisher: USPTO, Published in: US.
Mian, Ali, "CA Application No. 2,488,428 Office Action Jan. 27, 2011", , Publisher: CIPO, Published in: CA.
Chhim, S., "CA Application No. 2,646,432 Office Action Jan. 17, 2011", , Publisher: CIPO, Published in: CA.
Chhim, S., "CA Application No. 2,646,496 Office Action Jan. 17, 2011", , Publisher: CIPO, Published in: CA.
Anwah, Olisa, "U.S. Appl. No. 12/695,367, Notice of Allowance Dec. 21, 2010", , Publisher: USPTO, Published in: US.
S. Chhim, "CA Application No. 2,433,477 Office Action May 11, 2009", Publisher: CIPO, Published in: CA.
Hashem, Lisa, "U.S. Appl. No. 10/262,798 Office Action Apr. 16, 2009", Publisher: USPTO, Published in: US.
Bodnar, Kristina, "CA Application No. 2,454,966 Office Action Jun. 25, 2009", Publisher: CIPO, Published in: CA.
Gkeli, Maria, "EP Application No. 03 254 175.7 Office Action", Feb. 19, 2009, Publisher: EPO, Published in: EP.

\* cited by examiner

LOCATION BASED TO-DO LIST REMINDERS

STATEMENT OF RELATED APPLICATIONS

This application claims the benefit of U.S. Provisional Patent Application 60/380140, filed on 6 May 2002, entitled "Method for Interception, Manipulations, and Usage of Bluetooth Voice Streams."

FIELD OF THE INVENTION

The present invention relates to personal digital assistants in general, and, in particular, to reminders about tasks in a to-do list.

BACKGROUND OF THE INVENTION

A personal digital assistant (PDA) is a mobile device that stores information such as a calendar, to-do list, address book, etc. Typically an entry in a PDA's calendar is associated with a date, a starting time, and a duration (or equivalently, ending time), while a task in a to-do list might have an associated priority or an associated due date. A PDA typically has a facility for automatically reminding its user about an upcoming event in the calendar (e.g., the PDA might emit an audible beep ten minutes before a meeting, etc.) In addition, some PDAs (e.g., Microsoft "Pocket-PC" based PDAs, etc.) enable a user to pre-program a reminder for a task in the to-do list, where the user specifies an exact date and time for the reminder to occur.

An emerging trend in consumer electronics is the convergence of PDAs and other devices such as wireless telephones, laptop computers, GPS receivers, digital cameras, MP3 players, etc. For example, combination wireless telephone/PDAs are currently offered by manufacturers such as Samsung and Nokia, and Apple's iPod MP3 players have the capability to store contact and calendar information. Consequently, facilities typically associated with a PDA, including to-do lists, might be offered in other kinds of devices.

SUMMARY OF THE INVENTION

The present invention enables a wireless device to intelligently remind a user about a pending task in its to-do list whose accomplishment has a geographic aspect. In particular, the illustrative embodiment employs a to-do list in which tasks have an associated geo-location, and optionally, a priority and/or due date, and determines whether to remind the user about a task in the to-do list based on information including the following: the user's (i.e., the device's) current location; the user's speed and direction of travel; the geo-locations of tasks in the to-do list; the priorities of tasks in the to-do list; and the due dates of tasks in the to-do list.

As an example, consider the following task in a to-do list: "pick up jacket from cleaners." Accomplishment of this task has a geographic aspect, and thus it would be useful to remind the user about this task when the user happens to be in the vicinity of the cleaners. The meaning of "in the vicinity" might depend on the user's speed (e.g., if the user is riding in a car at forty miles-per-hour, this might mean within three miles; if the user is walking, this might mean within 500 yards, etc.). In addition, the time at which to remind the user should be based on the direction in which the user is moving (i.e., it makes more sense to remind the user when the user is traveling towards the cleaners than when he/she is traveling away from the cleaners).

When more than one task in the to-do list is in the vicinity of the user, it might be desirable to remind the user about only one of the tasks in order to avoid overwhelming the user with reminders. In such cases, one of the tasks could be selected based on a variety of factors, such as which task is closest, which task has the highest priority, which task has the earliest due-date, etc.

The illustrative embodiment comprises: a memory for storing a to-do list, wherein the to-do list comprises at least one task, and wherein each task is associated with a respective geo-location; and a processor for (a) receiving a current geo-location, and (b) determining whether to output a reminder based on the current geo-location and the respective geo-locations associated with each task.

DETAILED DESCRIPTION

Figure 1:
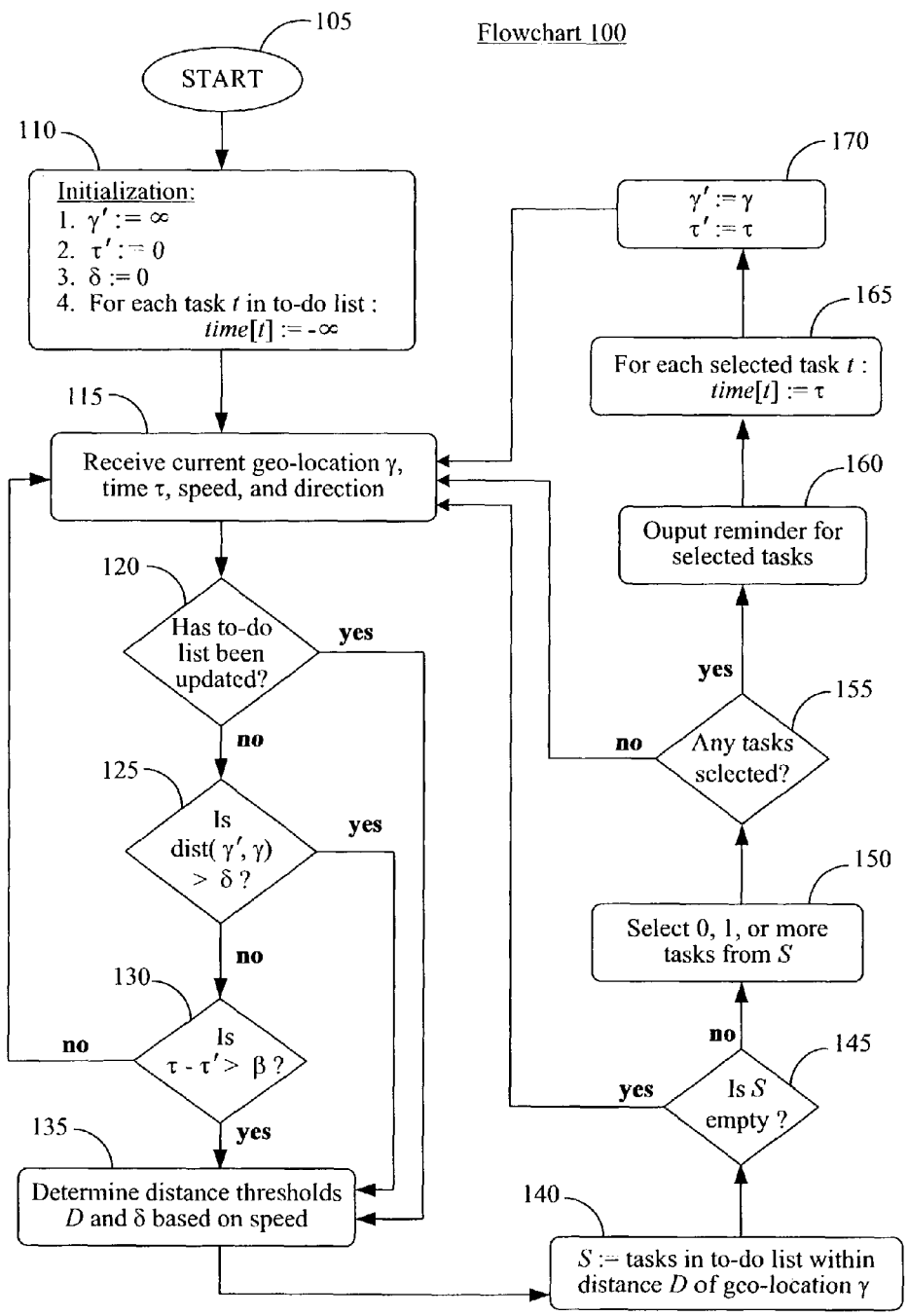
FIG. 1 depicts a flowchart of a method for determining whether to remind a user about one or more tasks in a to-do list, in accordance with the illustrative embodiment of the present invention.

FIG. 1 depicts a flowchart 100 of an illustrative method for determining whether to remind a user about one or more tasks in a to-do list, in accordance with the illustrative embodiment of the present invention. As disclosed below, this method executes as an infinite loop to continually determine whether to issue a reminder, and about which task(s) the user should be reminded. (Note that in the foregoing disclosure, tasks with numbers refer to tasks of the illustrative method, as opposed to tasks in the to-do list.)

At task 110, several variables are initialized. Variable $\gamma'$, which represents the geo-location at which a reminder was last generated, is initialized with a "dummy" value of $\infty$. (The use of $\infty$ rather than, say, zero will become apparent in the description of task 125, disclosed below.) Variable $\tau'$, which represents the time at which a reminder was last generated, is initialized to zero. Variable $\delta$, which represents an update distance threshold, is also initialized to zero. (A complete description of update distance threshold $\delta$ is disclosed below.)

Data structure time stores, for each task in the to-do list, the time at which a reminder was last generated for that particular task. Data structure time is initialized to $-\infty$ for every task; this effectively indicates that the user has not yet been reminded about any of the tasks since the beginning of the method's execution. The syntax shown in FIG. 1, which suggests an array for data structure time, is merely illustrative; as is well-known in the art, alternative data structures, such as a hashtable, can be used to store this information. An apparatus for performing task 110, and the other tasks of flowchart 100, is disclosed below in the description of FIG. 2.

At task 115, the current geo-location and time are received and saved in variables $\gamma$ and $\tau$, respectively; in addition, the current speed (e.g., expressed as meters/second, etc.) and direction of travel (e.g., expressed as degrees-minutes-seconds with respect to North, etc.) are received.

At task 120, the to-do list is checked for any updates since the previous iteration of this method. If the to-do list has changed, execution proceeds to task 135, disclosed below; otherwise, execution proceeds to task 125, disclosed below. In the first iteration of this method, the result of this test is "no" and execution proceeds to task 125.

At task 125, the distance between geo-locations $\gamma'$ and $\gamma$ is computed and compared to update distance threshold $\delta$, thus indicating whether the user has moved more than distance $\delta$ since the last reminder. By setting $\delta$ to an appropriately small value (as described below in the description of task 135), the method can detect when a user has "barely" moved since the last reminder. By detecting such occurrences, the method can avoid the unnecessary computational expense of task 145 (disclosed below) when a time threshold $\beta$ (also disclosed below) has not been exceeded.

If the user has not moved more than update threshold $\delta$, execution proceeds to task 130, disclosed below; otherwise execution proceeds to task 135. When task 125 is executed in the first iteration of this method, execution proceeds to task 135, since $\delta=0$ and $dist(\infty, \gamma)=\infty$ for any real-world geo-location $\gamma$.

At task 130, the difference between time $\tau$ and time $\tau'$ is compared to a time threshold $\beta$, thus indicating whether more than $\tau-\tau'$ units of time have elapsed since the last reminder. If the determination is negative, then execution jumps back to task 115 for the next iteration of the method. The rationale for skipping to the next iteration is that no reminder needs to be generated when: (i) the to-do list has not been updated, (ii) the user has barely moved since the last reminder, and (iii) not enough time has elapsed since the last reminder to warrant issuing another reminder. If the determination is positive, then execution proceeds to task 135.

As will be appreciated by those skilled in the art, in some embodiments of the present invention the value of time threshold $\beta$ might be constant, while in some other embodiments the value of time threshold $\beta$ might be dynamic, varying with one or more conditions (e.g., time of day, etc.). Similarly, in some embodiments a user might be able to manually set the value of time threshold $\beta$ to override a default value. As will be appreciated by those skilled in the art, the value of time threshold $\beta$ should be chosen to be large enough to avoid annoying a user with repeated reminders, while small enough to generate reminders in a useful fashion.

At task 135, distance threshold $\delta$ is determined. Since $\delta$ represents a threshold that indicates when a user has "barely" moved since the last reminder, it might be desirable in some embodiments to choose a value of $\delta$ based on the user's speed (received at task 115). For example, a value of 0.5 miles might be appropriate for a user that is walking, while a value of three miles might be appropriate for a user in an automobile traveling at 60 miles-per-hour. As will be appreciated by those skilled in the art, the choice of $\delta$ should be large enough to avoid unnecessary repetition of computations (task 140, disclosed below), while small enough to generate reminders in a useful fashion.

A second distance threshold, D, is also determined at task 135. Distance threshold D represents the radius of a circle centered at geo-location $\gamma$; this circle is used as a filter to eliminate tasks in the to-do list that have geo-locations outside the circle. Thus, distance threshold D is used to distinguish tasks in the to-do list that are potentially "close enough" to the user for reminding, from tasks that are "too far away."

In some embodiments it is desirable for the value of D to vary depending on the user's speed, since the idea of "closeness" might be different for a pedestrian than for a user riding in an automobile. Thus, in some embodiments D might be computed as a function of current speed (e.g., linear function, etc.).

At task 140, the set of tasks in the to-do list that have a geo-location within distance D of geo-location $\gamma$ is determined and stored in variable S. As is well understood in the art, there are a variety of approaches for determining set S, from "brute force" (i.e., computing the distance for each task and comparing the distance to D) to more efficient techniques based on computational geometry data structures and algorithms. As will also be appreciated by those skilled in the art, a variety of concrete data structures can be used to implement set S (e.g., a bit vector, etc.)

At task 145, set S is checked for emptiness; if S is empty, execution jumps back to task 115; otherwise, execution proceeds to task 150, disclosed below.

At task 150, zero or more tasks are selected from S (if S is non-empty) based on one or more of the following properties: geo-location with respect to the user's direction of travel; proximity to geo-location $\gamma$; priority; due date; and time[ ]. (The reason for selecting "zero or more" tasks instead of "one or more tasks" is described below.) As will be appreciated by those skilled in the art, a wide variety of selection algorithms can be employed based on these properties (e.g., selecting a task in S closest to geo-location $\gamma$; selecting a task in S with the highest priority; selecting a task in S with the earliest due date; selecting a task in S having the earliest value of time[ ] [i.e., a task about which the user has not been reminded for the longest amount of time]; etc.)

As will be well-known to those skilled in the art, a combination of these properties might be employed (e.g., by assigning an ordering to the properties for "breaking ties", by assigning weights to the properties, etc.), and the manner in which the properties are combined might be determined either (i) automatically (e.g., dynamically based on changing conditions, dynamic "learning" via user feedback, etc.) or by user input (e.g., choosing the most important property, etc.) In addition, in some embodiments rules might be established for selecting all tasks in S that satisfy one or more conditions, where a condition applies to one or more task properties. For example, a rule might specify that all tasks having (i) a priority higher than some value p, and (ii) a due date within some number of days n, should be selected. As another example, a rule might specify that a task must have a geo-location to which the user is getting closer in order to be considered for selection. As yet another example, a rule might specify that a task t can be selected only if the difference between the current time $\tau$ and time[t] is greater than, say, four hours (i.e., don't remind a user about a task less than four hours after the last reminder for that task).

In embodiments that incorporate rules, there might be an iteration of the method in which none of the tasks in S are eligible for selection. Thus, task 150 is the selection of "zero or more" tasks from S.

At task 155, a branch is executed based on the result of task 150. If no tasks were selected in task 150 (which can occur either (i) due to the application of a particular rule, or (ii) if set S is empty), then execution jumps back to task 115; otherwise, execution proceeds to task 160, disclosed below.

At task 160, a reminder for the tasks selected in task 150 is outputted. As will be clear to those skilled in the art, a reminder can take many different forms, such as an audible beep, a vibration, a blinking light, a message, etc. In addition, the reminder might be based on: the selected tasks (e.g., a reminder message might display the selected task(s), etc.); the number of tasks selected (e.g., the number of beeps or blinking lights might equal the number of tasks, etc.); a property of the selected task(s) (e.g., a red/yellow/green light based on priority, etc.); etc.

At task 165, for each task t selected at task 150, time[t], the time at which a reminder was last output for task t, is set to τ, the current time.

At task 170, the current location γ and current time τ are copied into variables γ' and τ', respectively; this establishes γ and τ as the location/time of the last reminder. Execution jumps back to task 115 for the next iteration of the method.

Figure 2:
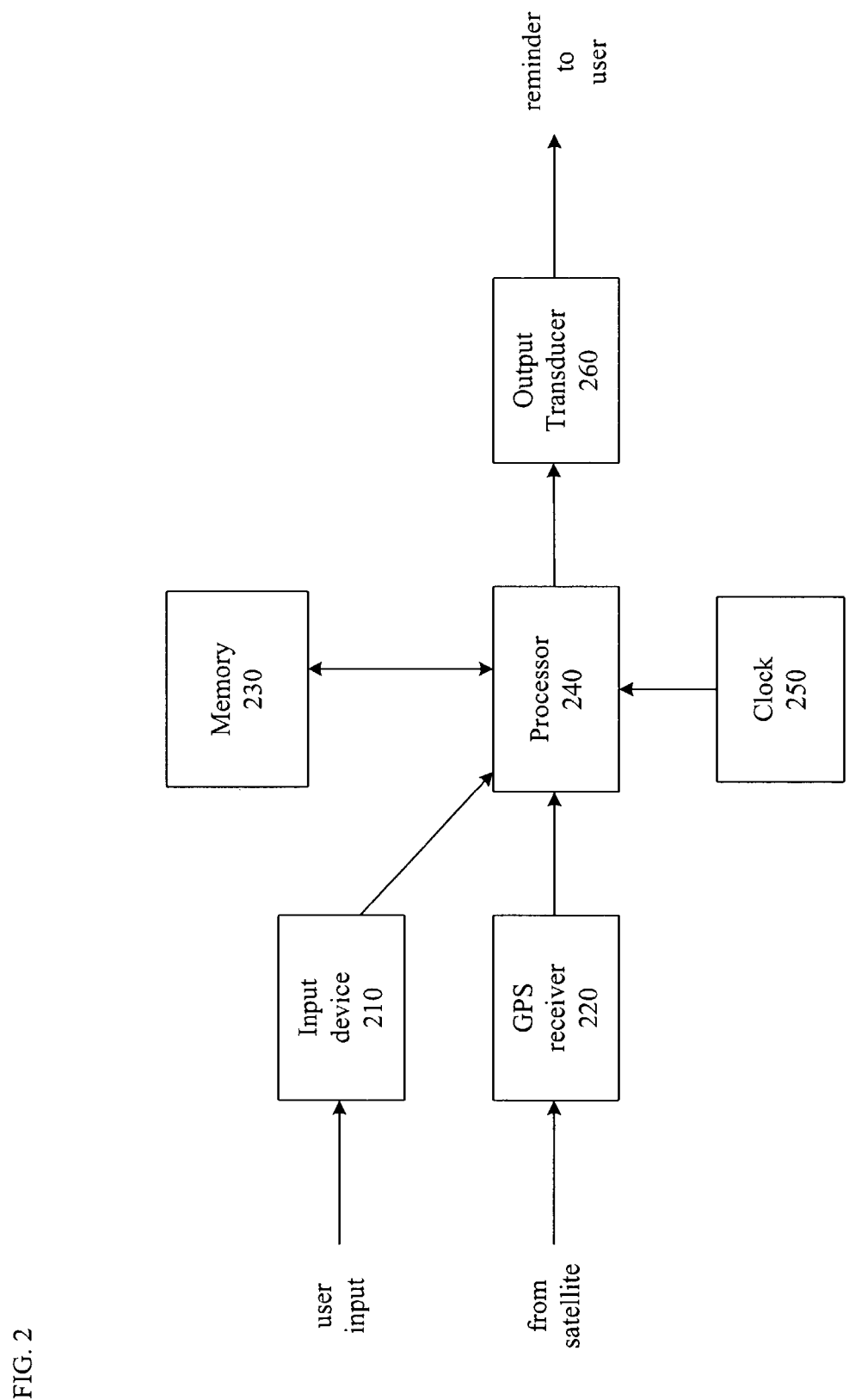
FIG. 2 depicts a block diagram of the salient components of an apparatus for performing the method depicted in FIG. 1, in accordance with the illustrative embodiment of the present invention.

FIG. 2 depicts a block diagram of the salient components of an apparatus performing the method of FIG. 1 in accordance with the illustrative embodiment of the present invention. As shown in FIG. 2, the apparatus comprises input device 210, global positioning system (GPS) receiver 220, memory 230, processor 240, clock 250, and output transducer 260.

Input device 210 enables a user to enter tasks for a to-do list, and sends these tasks to processor 240. As is well-known in the art, input device 210 can take a variety of forms, such as a keypad, pressure-sensitive touchscreen, etc.

In some embodiments, associated geo-locations for each task might be provided by the user via input device 210; a particularly convenient user interface for such embodiments is to display a geographical map and enable a user to specify a particular geo-location via input device 210 (e.g., by clicking on a location for a cursor/mouse-based input device, by touching a location for a touchscreen, etc.) As is well-known in the art, such interfaces typically allow a user to translate the geographical map (e.g., via selecting a new center location for the map, etc.) or change the scale of the map (e.g., via zooming in/out, etc.). In embodiments that also include an address book, as is typically the case for PDAs and other kinds of devices with PDA capabilities, a user might also associate tasks in the to-do list with addresses in the address book via input device 210.

GPS receiver 220 receives satellite-based signals for determining global position and velocity, as is well understood in the art, and sends this information to processor 240. It will be clear to persons skilled in the art that some embodiments might employ means other than satellite-based signals for determining geo-location (e.g., triangulation, radio beacons, radio-frequency fingerprinting [U.S. Pat. No. 6,393,294, incorporated by reference], etc.) In such embodiments, an appropriate receiver (e.g., radio-frequency receiver, etc.) would be substituted for GPS receiver 220, as is well understood in the art.

Memory 230 stores information for subsequent retrieval; as is well known in the art, memory 230 can take a variety of forms, such as a random-access memory, a flash memory, a disk drive, etc.

Processor 240 reads from and writes to memory 230, and performs logic, as is well-known in the art, in accordance with the illustrative method of FIG. 1. It will be clear to persons skilled in the art that in some embodiments, input device 210 might transmit user input directly to memory 230 for storage, rather than via processor 240, as is shown in FIG. 2. Similarly, in some embodiments GPS receiver 220 might transmit position and velocity directly to memory 230 for storage, rather than via processor 240.

Clock 250 provides the current time (τ) to processor 240, as is well-known in the art.

Output transducer 260 receives a reminder from processor 240, in accordance with the illustrative method of FIG. 1, and outputs a reminder signal for a user. Output transducer 260 can generate one or more kinds of signals (e.g., auditory, visual, tactile, etc.) and can take a variety of forms (e.g., one or more light-emitting diodes (LEDs), a speaker, etc.), as is well understood in the art.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A system comprising:
a processor; and
a computer-readable storage device storing instructions which, when executed by the processor, cause the processor to perform operations comprising:
receiving a current geo-location of a device associated with a user and a current speed at which the device associated with the user is traveling;
based on the current speed at which the device associated with the user is traveling, inferring a current mode of transportation associated with the device;
comparing the current geo-location and current speed of the device with a geo-location, a relative priority, and a relative due date of each pending task of a set of pending tasks associated with the user to yield a comparison; and
based on the comparison and the current mode of transportation, determining whether to output a notification reminding the user of a pending task of the set of pending tasks.

2. The system of claim 1, wherein the computer-readable storage device stores additional instructions which, when executed by the processor, cause the processor to perform a further operation comprising receiving a current direction in which the device associated with user is traveling, and wherein determining whether to output the notification is further based on the current direction.

3. The system of claim 1, wherein the computer-readable storage device stores additional instructions which, when executed by the processor, cause the processor to perform a further operation comprising determining to output the notification for a particular pending task based on the comparison and the mode of transportation, wherein a timing of the output of the notification is based on a current speed and direction of travel.

4. The system of claim 3, wherein the notification is for the particular pending task, and wherein the notification is selected for the particular pending task based on a determination that the particular pending task has at least one of a closest geo-location, a highest ranking, or a earliest due date.

5. The system of claim 3, wherein determining whether to output the notification is further based on the current geo-location's proximity to another geo-location associated with another task that the user is to perform in connection with the another geo-location.

6. The system of claim 1, wherein determining whether to output the notification further comprises determining whether the geo-location is within a distance threshold of the current geo-location, wherein the distance threshold is based on the current speed.

7. The system of claim 1, wherein determining whether to output the notification is further based on a distance between the current geo-location and the geo-location of each pending task.

8. The system of claim 1, wherein one of the current geo-location and a current speed is received via a global positioning system receiver.

9. A computer-readable storage device storing instructions which, when executed by a processor, cause the processor to perform operations comprising:
   receiving a current geo-location of a device associated with a user and a current direction in which the device associated with the user is traveling;
   comparing the current geo-location and current speed of the device with a geo-location, a relative priority, and a relative due date of each pending task associated with the user to yield a comparison;
   based on the comparison, generating a notification for a pending task, the notification providing a reminder of the pending task; and
   outputting the notification at a particular time determined based on a direction of travel associated with the device and the geo-location associated with the pending task.

10. The computer-readable storage device of claim 9, wherein determining whether to output the notification further comprises determining whether the geo-location is within a distance threshold of the current geo-location.

11. The computer-readable storage device of claim 9, wherein the notification is for the particular pending task, and wherein the notification is selected for the particular pending task based on a determination that the particular pending task has at least one of a closest geo-location, a highest ranking, or a earliest due date.

12. The computer-readable storage device of claim 9, wherein determining whether to output the notification is further based on a distance between the current geo-location and the geo-location.

13. The computer-readable storage device of claim 9, wherein determining whether to output the notification is further based on the current geo-location's proximity to another geo-location associated with another task that the user is to perform in connection with the another geo-location.

14. The computer-readable storage device of claim 9, wherein the pending task comprises one a plurality of pending tasks having a highest priority and an earliest due date.

15. The computer-readable storage device of claim 9, wherein determining whether to output the notification is further based on a time of a previous notification.

16. The computer-readable storage device of claim 9, wherein one of the current geo-location and a current direction is received via a global positioning system receiver.

17. A method comprising:
   receiving a current geo-location of a device associated with user and a current speed at which the device associated with user is traveling;
   based on the current speed at which the device associated with the user is traveling, inferring a current mode of transportation associated with the device;
   comparing the current geo-location and current speed of the device with a geo-location, a relative priority, and a relative due date of each pending task of a set of pending tasks associated with the user to yield a comparison; and
   based on the comparison and the current mode of transportation, determining whether to output a notification reminding the user of a pending task of the set of pending tasks.

18. The method of claim 17, further comprising receiving a current direction in which the device associated with the user is traveling, and wherein determining whether to output the notification is further based on the current direction.

19. The method of claim 17, wherein determining whether to output the notification further comprises determining whether the geo-location is within a distance threshold of the current geo-location, and wherein the notification is based on the pending task.

20. The method of claim 19, wherein the distance threshold is based on the current speed.

21. The method of claim 17, wherein determining whether to output the notification is further based on a distance between the current geo-location and the geo-location associated with the pending task.

22. The method of claim 17, wherein the pending task comprises one a plurality of pending tasks having a highest priority and an earliest due date.

23. The method of claim 17, wherein determining whether to output the notification is further based on a time of a previous notification.

24. The method of claim 17, wherein one of the current geo-location and a current speed is received via a global positioning system receiver.

* * * * *

UNITED STATES PATENT AND TRADEMARK OFFICE
CERTIFICATE OF CORRECTION

PATENT NO.        : 9,558,475 B2
APPLICATION NO.   : 10/350399
DATED             : January 31, 2017
INVENTOR(S)       : Doree Duncan Seligmann It is certified that error appears in the above-identified patent and that said Letters Patent is hereby corrected as shown below:

On the Title Page

Item (54) and in the Specification, Column 1, Line 1 please correct the title:
Delete "LOCATION BASED" and insert --LOCATION-BASED-- therein.

Signed and Sealed this
Eighteenth Day of April, 2017

Michelle K. Lee
*Director of the United States Patent and Trademark Office*